United States Patent
Sivathanu et al.

(10) Patent No.: US 10,712,251 B2
(45) Date of Patent: Jul. 14, 2020

(54) SYSTEM FOR ESTIMATING PLANAR DROP SIZES

(71) Applicant: En'Urga, Inc., West Lafayette, IN (US)

(72) Inventors: Yudaya R. Sivathanu, West Lafayette, IN (US); Vinoo Narayanan, West Lafayette, IN (US); Jongmook Lim, West Lafayette, IN (US); Jason Green, West Lafayette, IN (US)

(73) Assignee: En'Urga, Inc., West Lafayette, IN (US)

( * ) Notice: Subject to any disclaimer, the term of this patent is extended or adjusted under 35 U.S.C. 154(b) by 278 days.

(21) Appl. No.: 15/873,575

(22) Filed: Jan. 17, 2018

(65) Prior Publication Data

US 2019/0219491 A1 Jul. 18, 2019

(51) Int. Cl.
*G01N 15/02* (2006.01)
*G01N 15/00* (2006.01)

(52) U.S. Cl.
CPC . *G01N 15/0211* (2013.01); *G01N 2015/0026* (2013.01); *G01N 2015/0046* (2013.01); *G01N 2015/0222* (2013.01)

(58) Field of Classification Search
CPC ....... G01N 15/0211; G01N 2015/0222; G01N 2015/0026; G01N 2015/0046
USPC ........................................................ 356/336
See application file for complete search history.

(56) References Cited

U.S. PATENT DOCUMENTS

| 4,779,003 | A  | * | 10/1988 | Tatsuno | ............ G01N 15/0211 250/575 |
|---|---|---|---|---|---|
| 5,363,198 | A  |   | 11/1994 | Fournier |  |
| 5,570,181 | A  |   | 10/1996 | Yasuo et al. |  |
| 5,798,840 | A  |   | 8/1998  | Beiting |  |
| 6,184,989 | B1 |   | 2/2001  | Sivathanu et al. |  |
| 8,134,703 | B2 | * | 3/2012  | Sivathanu | ........... G01M 99/008 356/335 |
| 9,459,216 | B2 | * | 10/2016 | Sivathanu | .............. G01N 23/04 |
| 2009/0279081 | A1 | * | 11/2009 | Urano | ................. G01N 21/9501 356/237.5 |

(Continued)

OTHER PUBLICATIONS

Lim, J., Green, J., Sivathanu, Y., "Tomographic Reconstruction of Scattering Phase Function of Drops in an Urea Injector," May 2017, pp. 1-8, ILASS-Americas 29th Annual Conference on Liquid Atomization and Spray Systems, Atlanta, GA.

*Primary Examiner* — Sunghee Y Gray
(74) *Attorney, Agent, or Firm* — Brinks Gilson & Lione

(57) ABSTRACT

A system includes a method and apparatus suitable for measuring planar drop sizes in a liquid spray. Measurement may involve illuminating the spray with multiple lasers and measuring the scattered intensities at several view angles using linear arrays. The system may use inverse calculation of the measured scattered intensity to estimate the local drop sizes across the entire plane in a spray. The system includes radiation detectors containing sensing elements, a lens systems, and analog to digital conversion board to convert scattered intensities to drop sizes. In addition, the system may include choppers including at least two unique filters. The filters may be selectively placed in a path between the spray and the sensing elements. By selectively placing a single array may measure both a scattered intensity and an extinction of laser light emitted from the spray.

12 Claims, 8 Drawing Sheets

(56) References Cited

U.S. PATENT DOCUMENTS

| | | | |
|---|---|---|---|
| 2011/0181869 A1* | 7/2011 | Yamaguchi | G01N 21/21 356/72 |
| 2014/0375992 A1* | 12/2014 | Sugasawa | G01N 15/0211 356/336 |
| 2014/0379289 A1* | 12/2014 | Sugasawa | G01N 15/0205 702/128 |

* cited by examiner

SYSTEM FOR ESTIMATING PLANAR DROP SIZES

BACKGROUND

Measuring drop sizes in sprays consisting of liquid or solid particles is a useful endeavor in a variety of capacities. The techniques are useful in estimating drop sizes in sprays that are used in a variety of applications such as consumer goods, fuel injectors, coating applicators, spray dryers, and pharmaceutical nebulizers.

SUMMARY

The present system provides a method and apparatus for estimating planar drop sizes using scattering tomography.

According to a first aspect of the system a method of measuring scattering signatures from a laser sheet is disclosed. The method comprises forming a laser sheet using optical lenses, illuminating the spray with the laser sheet, and imaging the scattered intensity at a different angle from the incident laser sheet.

According to a second aspect of the system, the system may use three independent optical portions, a laser illuminator, a laser extinction imager, and a laser scattering imager. The laser illuminator may include a fan laser collimated using a lens to form a collimated sheet having a preselected width. The laser source provides a beam of uniform density. A chopper including a filter is placed in the path of the laser beam so that the scattered image and the extinction measurement can be measured with the same detector array.

A third aspect of the system may be that the use of a three dimension (3D) high frequency linear detector arrays enables measurements along the axis of the spray as well that are not achieved with two dimensional (2-D) arrays.

An interesting technical aspect of the system is that the drop sizes may be obtained over the entire measurement plane. Any non-uniformities in the spray domain may be obtained from the measured intensities.

Another interesting technical aspect of the system is that the multiple scattering effects may be automatically accounted for in the deconvolution algorithm. Therefore, the system works very well in dense sprays.

Other aspects and advantages of this system will be better understood from the following detailed description.

DETAILED DESCRIPTION

Figure 1:
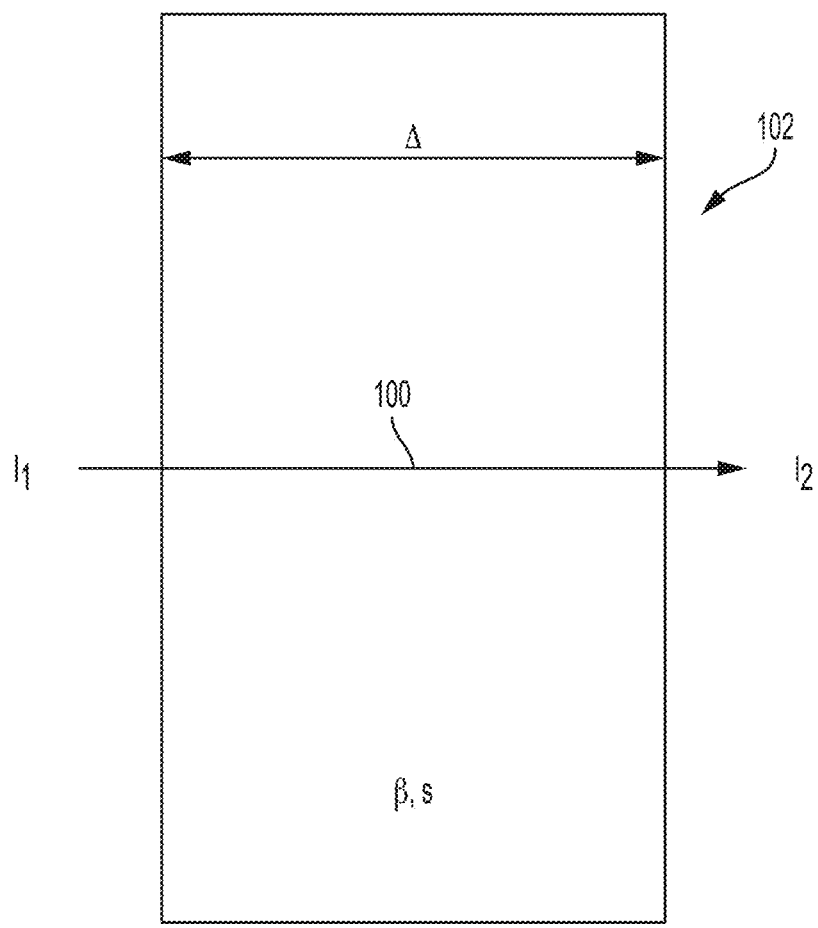
FIG. 1 is a schematic of an example homogenous path.

The present system generally relates to measuring the drop sizes in sprays consisting of liquid or solid particles. The techniques utilized in this system are useful in estimating drop sizes in sprays that are used in a variety of applications such as consumer goods, fuel injectors, coating applicators, spray dryers, and pharmaceutical nebulizers.

The transfer of mass, momentum, energy, and species at any location in a spray is directly proportional to the surface area of drops at that location. One of the methods of estimating the surface areas is to directly measure the drop sizes in the spray. Drop size is one of key parameters in applications such as spray drying and coating of surfaces. For this reason, development or quality control process require quick and reliable tools to determine the drop sizes in the pharmaceutical and paint industry. Laser based instruments has been developed and commercialized, to measure drop sizes since they offer non-intrusive and spatially resolved measurements, compared to the physical probing.

The Phase Doppler Anemometer (PDA) or interferometer can measure simultaneously the drop sizes and velocities at a single point in a spray. The measurement provides statistics of drop size and velocity distribution in sprays, and is widely used for research and development purposes. Laser diffraction techniques have been used extensively to provide line of sight measurements of drop size distribution in sprays. The diffraction instruments use Mie theory to estimate the drop size distribution from the scattering intensity measurements at one view angle. A single point drop size measurement is generally not sufficient for characterization of nozzle because drop size varies significantly over the spray domain. Therefore, performing 2-D (for PDA) or 1-D scanning (for diffraction based instruments) is necessary to characterize the spray fully. However, spatial scanning with the interferometry or the diffraction technique is time consuming, and collating the data is labor intensive. Therefore, such methods are not used widely for quality audit of nozzles and injectors.

The present system is directed to measuring the planar drop sizes in a spray. The system measures the intensities of scattered radiation from a liquid spray at six angles using high speed linear arrays. These measured intensities are used to obtain the drop sizes.

Measurement techniques to estimate the planar drop sizes in a spray may be performed without the need for scanning. For example, a LIF/Mie ratio technique may be used to obtain planar drop size distribution. The LIF/Mie technique may use the ratio of laser induced fluorescence and scattered light to estimate drop sizes. The LIF/Mie technique is based on the fact that fluorescence emission is proportional to the volume of the droplet, while the scattering intensity is proportional to the surface area of the drops. Therefore, the ratio of fluorescence and scattered intensity is related to the Sauter Mean Diameter (SMD) of the drops since SMD is defined as:

$$SMD = \frac{\int D^3 \, P(D) dD}{\int D^2 \, P(D) dD} \quad (1)$$

where P(d) is probability density function for the number density of drops. However, fluorescence emission from liquids in their natural state is very weak. Therefore, the liquid is doped with a fluorescence dye such as rhodamine, fluorescein, or N,N,N',N'-tetramethyl-p-phenylenediamine, also known as TMPD, to increase the accuracy of the measurements. Adding dye to the liquid may not be desirable in the industrial testing processes. For example, rhodamine is toxic and corrosive agent which cannot be used in production environments. Another important issue with using the LIF/Mie technique is multiple scattering effects when the spray is dense. Multiple scattering causes redistribution in spatial intensity for scattering intensity as well as fluorescence emission. In addition, the scattering pattern for laser light and fluorescence emission is completely different because location of the light source(s) is not same. Thus, the ratio of fluorescence and scattering intensity would be biased in the SMD measurement. It may be argued that LIF/Mie technique shows better accuracy than PDA measurements in dense sprays, however, a detailed analysis of multiple scattering effects in these sprays is not available.

Interferometric laser imaging (ILIDS), may be used to exploit the interference between light reflected from, and refracted through, individual drops in the forward-scatter region to estimate planar drop sizes. The ILIDS technique may be used for estimating drop sizes only in spatially sparse spray and sprays with large drop sizes. A planar drop size technique that uses polarization ratio of the scattered intensity may also be used. This planar drop size technique is based on the fact that the scattered intensity roughly increases with the square of the drop diameter D, if the incident light is polarized perpendicular to the scattering plane, while it roughly increases with droplet diameter D when the incident beam is polarized parallel to the scattering plane. The planar drop size technique may be used to estimate drop sizes in automotive injectors, however, this technique also suffers from multiple scattering effect for dense sprays.

Extinction tomography for spray may be used to estimate spatial distribution of the surface area of the drops in a plane. An example of a basic instrument to estimate spatial distribution is described in U.S. Pat. No. 6,184,989. Planar extinction measurement on the spray field does not suffer from the multiple scattering effect, thus, the drop surface area measurement through extinction tomography is free from the multiple scattering effect even when the spray is optically dense. The present system seeks to estimate the local scattering intensity so as to obtain drop size information over an entire plane.

Consider a homogeneous path 100 in a scattering turbulent spray 102 as shown in FIG. 1. For a line of sight scattering measurement of the homogeneous path 100, the rate of change of intensity along the line is given by:

$$\frac{dI_\lambda}{ds} = -(\alpha_\lambda + \sigma_\lambda) \cdot I_\lambda + S_\lambda = -\beta_\lambda \cdot I_\lambda + S_\lambda \quad (1)$$

where $I_\square$ to is the local intensity which varies as a function of distance s, $\beta_\lambda$ is the extinction coefficient (comprised of the scattering coefficient $\sigma_\lambda$, and the absorption coefficient $\alpha_\lambda$), and $S_\lambda$ is the source term for intensity. The total change $\Delta$ in intensity (I) occurs over the homogeneous path 100. If, the source term is constant for the homogeneous path, the formal solution is given by:

$$I_\lambda^2 = \frac{S_\lambda}{\beta_\lambda} * (1 - \exp(-\beta_\lambda \cdot \Delta)) + I_\lambda \cdot \exp(-\beta_\lambda \cdot \Delta) \quad (2)$$

For scattering tomography, the source term can be represented as:

$$S = \sigma_\lambda \int_\Omega I_s \cdot \Phi(\theta) d\Omega \quad (3)$$

where $I_s$ is incident intensity from the laser light, and $\Phi(\theta)$ is scattering phase function toward a given scattering angle, $\theta$. For water drops, absorption is negligible at the laser wavelength of 632 nm. Alternatively or in addition, the wavelengths of the laser light may be anywhere from the range of infrared to x-rays, including infrared, visible, ultraviolet, or x-ray wavelengths. Therefore, the scattering coefficient is effectively equal to the extinction coefficient, and the resulting radiative transfer equation (RTE) is:

$$I_\lambda^2 = I_s \cdot \int_\Omega \cdot \Phi(\theta) d\Omega \cdot (1 - \exp(-\beta_\lambda \cdot \Delta)) + I_\lambda^1 \cdot \exp(-\beta_\lambda \cdot \Delta) \quad (4)$$

Figure 2:
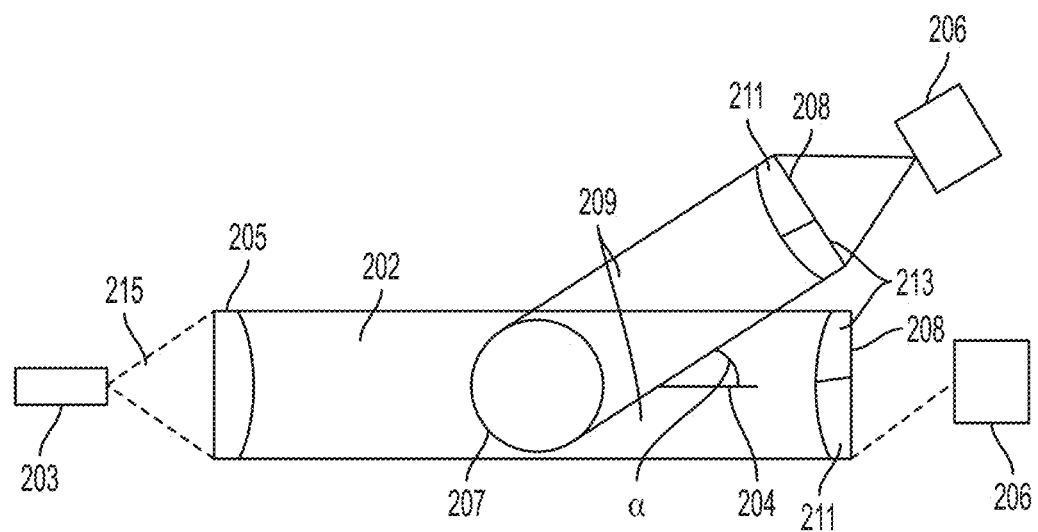
FIG. 2 is an example of a schematic representation of a planar drop sizing apparatus.

FIG. 2 shows an example geometry of a system 200 for scattering and extinction tomography. As shown in FIG. 2, a laser source 203 directs laser light 215 toward a lens 205. The laser light 215 passing through the lens 205 may form a laser sheet 202. The laser sheet 205 may contact a liquid spray 207 (shown as a cross-section in FIG. 2). The laser sheet 205 contacting the spray 207 may cause an amount of scattered light 209 to emit from the spray 207. The scattered light may pass through a filter 211. After passing through the filter 211, the scattered light 209 may be sensed by an array 206. The array 206 may sense or measure a scattered intensity of the scattered light 209. Alternatively or in addition, the array 206 may sense or measure an extinction of the scattered light 209.

The laser source 203 may be any device capable of producing a directed beam of laser light 215. In some examples, a plurality of laser sources 203 may be present to each produce a respective beam of the laser light 215, resulting in a plurality of beams of laser lights 215 produced. Alternatively, or in addition, the beam of laser light 215 produced by one or more laser sources 203 may be divided to generate multiple beams of laser light 215. The laser source 203 may include the lens 205 to allow the laser light 215 produced by the laser source 203 to be expanded into the laser sheet 202. The laser source 203 may produce laser light 215 having any wavelength from infrared wavelengths through x-ray wavelengths, inclusively. Accordingly, the laser light 215, for example, include an infrared wavelength of up to and including 1000 nm. The laser light 215 may, for example, include an x-ray having an amount of energy, such as from 10 to 50 KeV where extinction is measurable. Alternatively or in addition, the laser light 215 may, for example, include an x-ray wavelength associated with the amount of energy described in the previous sentence.

The lens 205 may be any optical elements capable of creating the laser sheet 202 from the laser light 215 from the laser source 203. The lens 205 may be formed in such a way to provide suitable refraction of the laser light 215 from the laser source 203 to form the laser sheet 202. In some examples, the lens may include glass. The lens 205 may provide a means for producing a "top hat" profile, which may also be described as a uniform density profile for the laser sheet 202. A uniform density profile may be a laser sheet that has the same intensity along a length of the sheet. The uniform density profile of the laser sheet 202 avoids complications in measurements that would arise if the spray 207 were exposed to a laser sheet of non-uniform density.

The laser sheet 202 may be a resulting beam of laser light with a wider (or larger area) than the area of the laser light 215 initially produced from the laser source 203. The laser sheet 202 may have a uniform density. At least because the laser sheet has uniform density, each of the droplets in the spray 207 will be exposed to substantially equal amounts of light, resulting in more accurate measurements. Substantially equal amount of light may be a configuration in which the individual elements of the pixel array provide roughly the same voltages. For a Gaussian beam, the light intensity falls off very sharply away from the center portion of the sheet and therefore, the voltage levels at the edges of the sheet are much lower than that at the center of the laser sheet. Each of the beams of laser light 215 may pass through the lens 205 each resulting in a respective laser sheet 202.

The scattered light 209 may be a beam or a sheet of light that emits from the spray 207 as a result of the laser sheet 202 passing through the spray 207. The scattered light 209 may be directed at, or received by, the array 206. As a result of the laser sheet 202 passing through the spray 207, the scattered light 209 may be emitted at an angle $\alpha$ to a laser sheet axis 204. The angle $\alpha$ may be any angle measurement that the scattered light 209 may be emitted from the spray 207. For example, the scattered light 209 may be emitted at a 0° angle. Alternatively or in addition, for example, the scattered light 209 may be emitted at a 30° angle. The measurements are preferred in the angle ranges from 0 degrees to 45 degrees, from 135 degrees to 225 degrees, and 315 degrees to 360 degrees to the laser sheet axis 204.

The array 206 may be any device(s) capable of sensing the scattered light 209 from the spray 207. The array 206 may sense or measure extinction and scattering intensities along a line of travel of the spray 207 at a predetermined number of view angles, such as 6 view angles, and a predetermined number of projections, such as 512 projections, at each view angle. A projection is an occurrence when one of the light beams falls on one pixel. If, for example, a 512 element array is used, it is possible to measure the scattered light 209 at 512 locations on the array 206. The measurement of the scattered light 209 at each of the 512 pixels is called a projection (a standard term in tomography). FIG. 2 shows only two view angles, however, the system may include any number of view angles. In some examples, the arrays 206 may be configured to take one or more multiple projections. For example, the array 206 may be configured to take 256, 512, 1024, or more projections. In examples where x-ray wavelengths of light are used, the array 206 may be a suitable array to measure x-rays. A local extinction coefficient is obtained using deconvolution. The Maximum Likelihood Estimation method may be used for the calculation of the local extinction coefficient. Deconvolution may be a process by which a convolution function is separated into functions from which the convolution function was formed in order to separate the effects convoluted in the convolution function. In some examples, the array 206 may include a photo-diode array. Alternatively or in addition, in some examples, the array 206 may include a linear array. Alternatively or in addition, the array 206 may include a 2-D camera. The 2-D camera may be any camera capable of capturing 2-dimensional images. In other examples, the array may be any combination of a photo-diode array, a linear array and/or a 2-D camera.

A scattered intensity of the scattered light 209 is typically a predetermined amount, such as 1000 times, less than the extinction intensity. Therefore, a chopper 208 is present. The chopper 208 may be any device capable of selectively positioning filters between the spray 207 and the array 206. The chopper 208 may include filters such as a laser light filter 211. Alternatively or in addition, the chopper 208 may include a neutral density filter 213. The laser light filter 211 may allow the scattered light 209 to pass through the laser light filter 211 with approximately unchanged intensity. Alternatively or in addition, the chopper 208 may include the neutral density filter 213. The scattered light 209 may have decreased intensity as a result of passing through the neutral density filter 213. In some examples, the chopper 208 may include the laser light filter 211 and the neutral density filter 213. The chopper 208 may be capable of selectively oscillating between filters 211, 213 in order to interrupt the scattered light 209 path from the droplets to the array 206. For example, when a scattered intensity is desired to be measured by the array 206, the chopper 208 may place the laser light filter 211 in the light path between the scattered light 209 and the array 206 such that the scattered light 209 passes through the laser light filter 211 and proceeds to the array 206. Alternatively, when an extinction measurement is desired to be taken by the array 206, the chopper 208 may place the neutral density filter 213 between the laser light and the array 206 such that the scattered light 209 passes through the neutral density filter 213 and proceeds to the array 206. This configuration affords at least two benefits: (1) extinction and scattered intensity measurements may be taken by the same array, and (2) the neutral density filter prevents the array from becoming saturated when measuring extinction.

In some examples, the chopper 208 decreases the intensity of the laser light to allow for a single array 206 to measure both an extinction and a scattered intensity.

The scattering tomography algorithm is designed to retrieve the local scattering phase function, $\Phi(\theta)$, from the line of sight scattering and extinction measurements. The scattering phase function is directly related to the SMD of the drops through Mie Theory.

Figure 3:
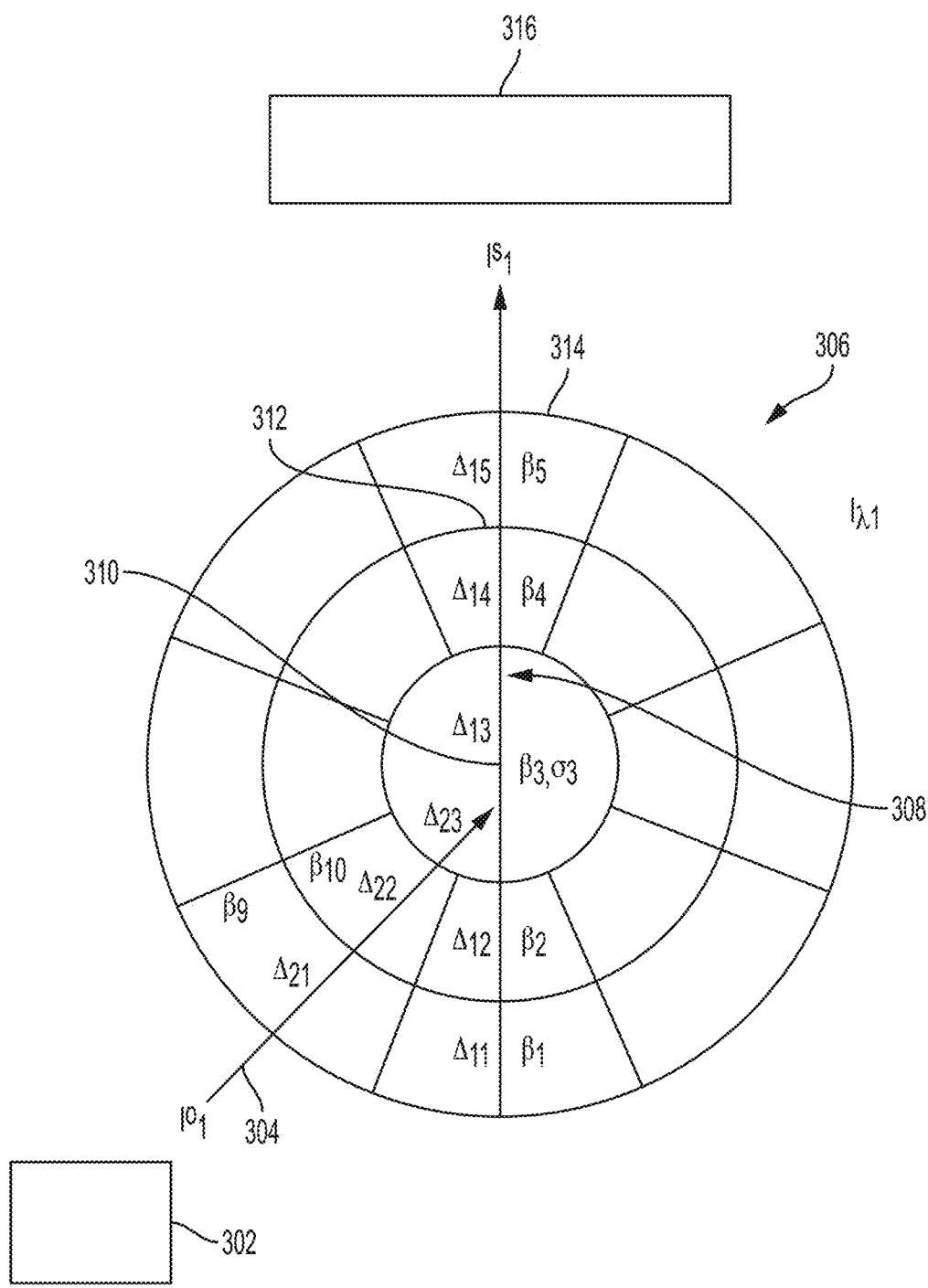
FIG. 3 is an example of a schematic representation of a domain over which the drop sizes are measured.

The calculation domain for scattering and extinction tomography is shown in FIG. 3. In the optical arrangement shown in FIG. 3, only the light scattered once from the laser source 302 is accounted for, as the multiply scattered light is much smaller, (approximately 1000 times less) than the singly scattered light.

In FIG. 3, the optical path lengths $\Delta_{11}, \Delta_{12} \ldots \Delta_{15}$ for a scattering line 306 are shown, and path lengths $\Delta_{21}, \Delta_{22}, \Delta_{23}$ for the incident laser line 304 are also shown. For each segment, the optical properties are assumed to be constant. The extinction coefficients $\beta_i$ on segment, i, and was obtained from extinction tomography. The incident laser intensity $I_i$ at any point on the scattering axis can be estimated from the following relationship.

$$I_i = I_i^o \cdot \exp(-\beta_9 \cdot \Delta_{21} - \beta_{10} \cdot \Delta_{22} - \beta_3 \cdot \Delta_{23}) \quad (5)$$

The incident intensity $I_i$ is scattered onto the scattering axis (vertical axis in FIG. 3), and the scattered intensity $I_m$ is calculated from the Eq. 5 as:

$$I_m = I_i \cdot \Phi_{i,j} \cdot (1 - \exp(-\beta_3 \cdot \Delta_{13})) \quad (6)$$

The scattered intensity $I_m$ t the joint 310 will go through segment 312 and segment 314 to reach the sensor 316, and it will be attenuated by the spray droplet on the domain. Thus, the measured scattering signal 202 can be estimated as:

$$I_j^s = \eta_j \cdot I_m \cdot \exp(-\beta_4 \cdot \Delta_{14} - \beta_5 \cdot \Delta_{15}) \quad (7)$$

where $\eta_j$ is optical efficiency of the sensor at pixel j. Since the measured intensity at the pixel, j, is the sum of all incident lines from the laser, the final equation for the scattered intensity at the pixel, j, is represented as:

$$I_s^j = \eta_j \cdot \Sigma_i I_o^i \cdot [\Pi_k \exp(-\beta_k \cdot \Delta_{ki})] \cdot \Phi_{i,j}(1-\exp(-\beta_i \cdot \Delta_{i,j}))[\Pi_m \exp(-\beta_m \cdot \Delta_{m,j})] \quad (8)$$

The equation (8) is for a single line of projection. From the 6-axis SETscan system shown in the example system of FIG. 4, 6 times 512 projections are available. Thus a system of equations can be constructed from the 6-axis measurements. The equation (8) is linear to the unknown variable, $\cdot\Phi_{i,j}$, (scattering phase function at each segment). The system of equations is also non-negative since all transmittances and scatterings are positive. This satisfies all the criteria required to obtain the most optimal solution using the Maximum Likelihood Estimation (MLE) method (Vardi and Lee, 1993) (Vardi, Y., and Lee, D., "From Image Deblurring to Optimal Investments: Maximum Likelihood Solutions for Positive Linear Inverse Problems," J. R. Statist. Soc. B, vol. 55, pp. 569-612, 1993.) The MLE method guarantees convergence to the most optimal solution. It should be noted that other methods of converting the intensities to temperature, such as other linear and non-linear iteration methods can be used with the present system.

Figure 4:
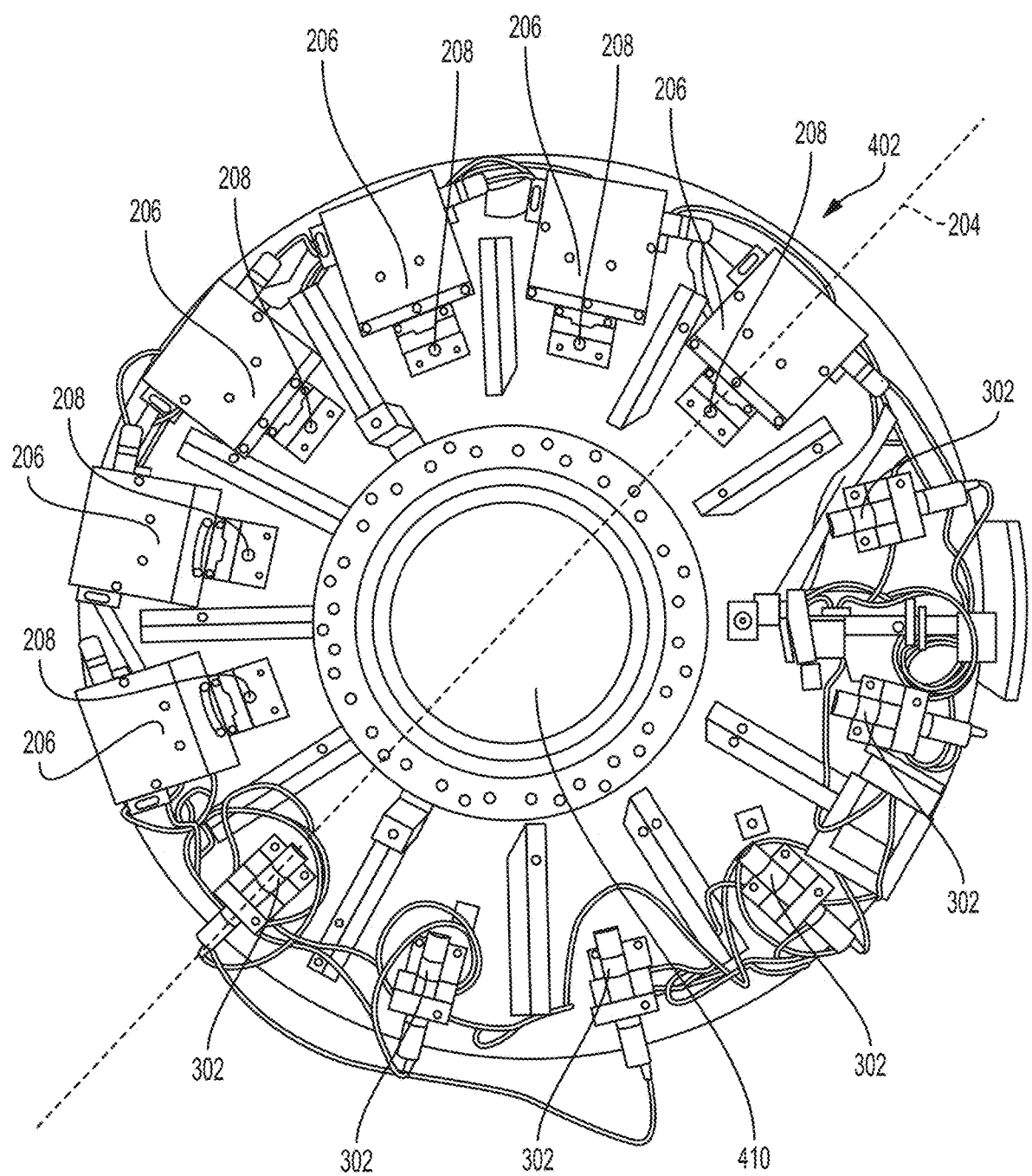
FIG. 4 is a photograph of an example of the planar drop sizing apparatus showing a plurality of lasers and detector arrays of the planar drop sizing apparatus.

For exemplary purposes, the construction of an apparatus 402 shown in the example system of FIG. 4 can be further described. The spray 207 may be supplied to a channel 410. The channel may define a route for the spray 207 to travel through the laser sheet 202. The spray may be subjected to the laser sheet when passing through the channel 410. Extinction measurements, for example, may be taken by turning on all lasers sources 203 and extinction measurements may be taken by the arrays 206 simultaneously for all six axes. Alternatively or in addition, for example, scattering measurements may be taken by only one laser source 203 turning on at a time, and the scattering intensity may be measured at 30 degrees from the laser axis 204. These measurements may then be repeated for the other five axis as well. Alternatively or in addition, when the extinction measurements are obtained, the chopper 208 may place the neutral density filter 213 (0.3% transmission) in front of the array 206 to decrease the intensity of the scattered light 209 and prevent the arrays 206 from being saturated. Alternatively or in addition, when scattering measurements are obtained, the chopper 208 may remove the neutral density filter 213 from the path of the scattered light 209 and instead place the laser light filter 211 in front of the array 206 to increase the intensity of the scattered light 209. The neutral density filter may serve to attenuate direct laser light and inhibit saturation of the arrays 206. The scattered intensity may be 1000 time less than the laser intensity for extinction measurement. In some examples, the chopper 208 may oscillate between placing the laser light filter 211 in front of the array 206 and the neutral density filter 213 in front of the array 206. The height of CMOS sensor of the OP200 is a predetermined height, such as 0.5 mm, and small height of sensor helps to eliminate the unwanted contribution from multiple scattering.In a preferred embodiment, the switching the laser on and off is achieved using an optical or mechanical shutter.

Figure 5:
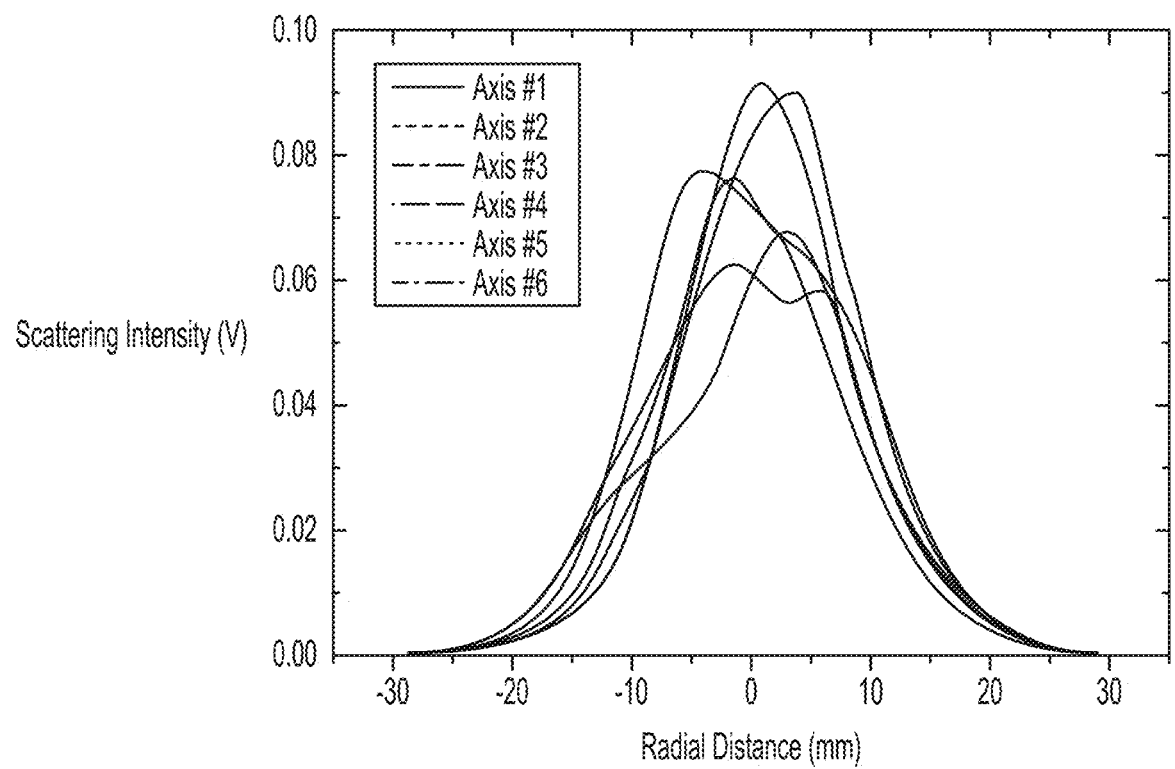
FIG. 5. is a graph showing the scattering intensities measured by the six arrays of the planar drop sizing apparatus.

An oiled nozzle was used to collect scattered intensity data. The scattering intensity profiles at 30 degrees for all the six axes are shown in the example of FIG. 5. FIG. 5 shows an example of the scattering signals from the spray measured for the 6 axes.

It should be noted that the methodology described above results in a obtaining drop sizes across the entire plane. This is a marked departure from methods such as Phase Doppler Interferometer (PDI) which provide drop sizes at only one point in the plane or diffraction systems that provide only the drop size information averaged along one path in the spray.

Figure 6:
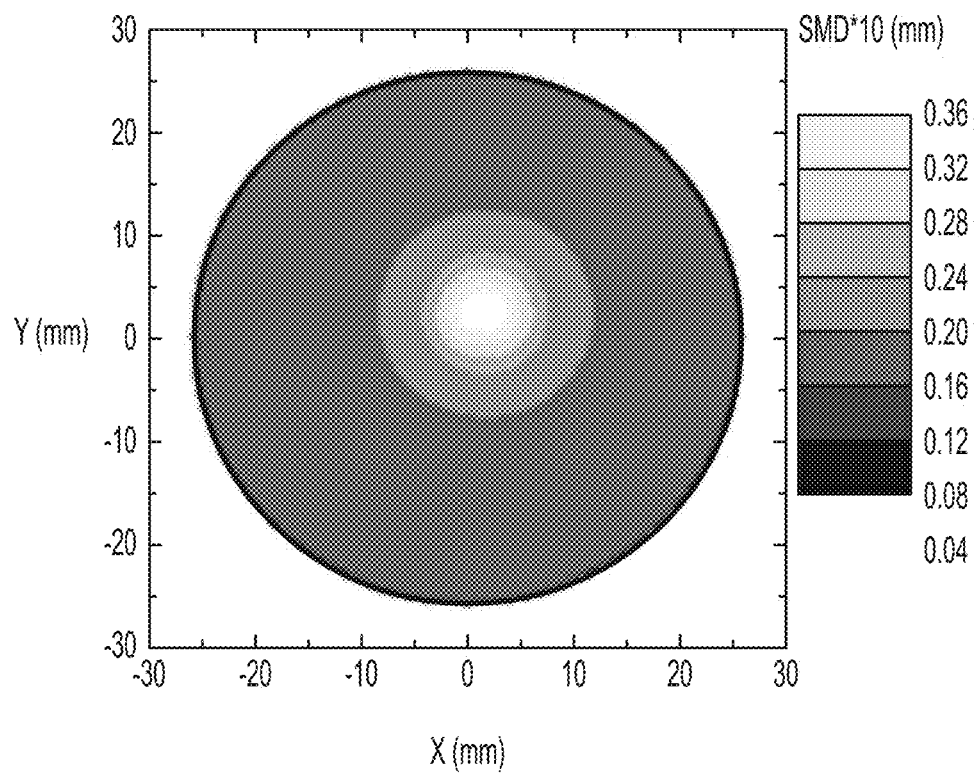
FIG. 6 is a plot showing an example of SMD distribution using synthetic data.
Figure 6:
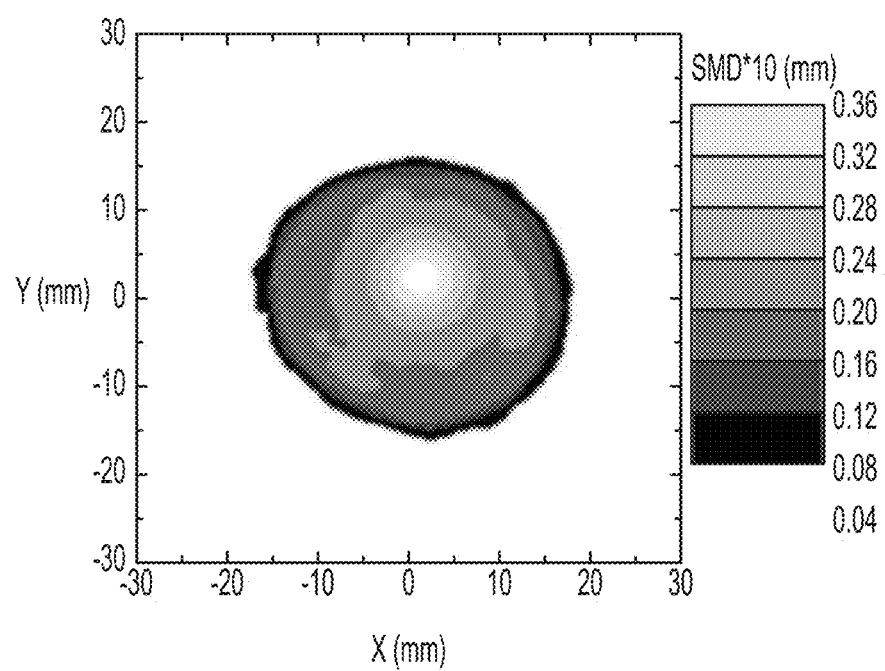

FIG. 6 shows an example of the input and recovered mean drop sizes in a synthetic spray. To verify the system operation, synthetic data was generated using the forward equation of radiative transfer and then deconvoluted. The drop sizes within the domain was assumed to have a SMD of 30 microns. The drops were assumed to be bigger in the center and smaller at the edges. The planar phase function distribution used for the synthetic data generation and the deconvoluted phase function distribution is shown in the example of FIG. 6.

Figure 7:
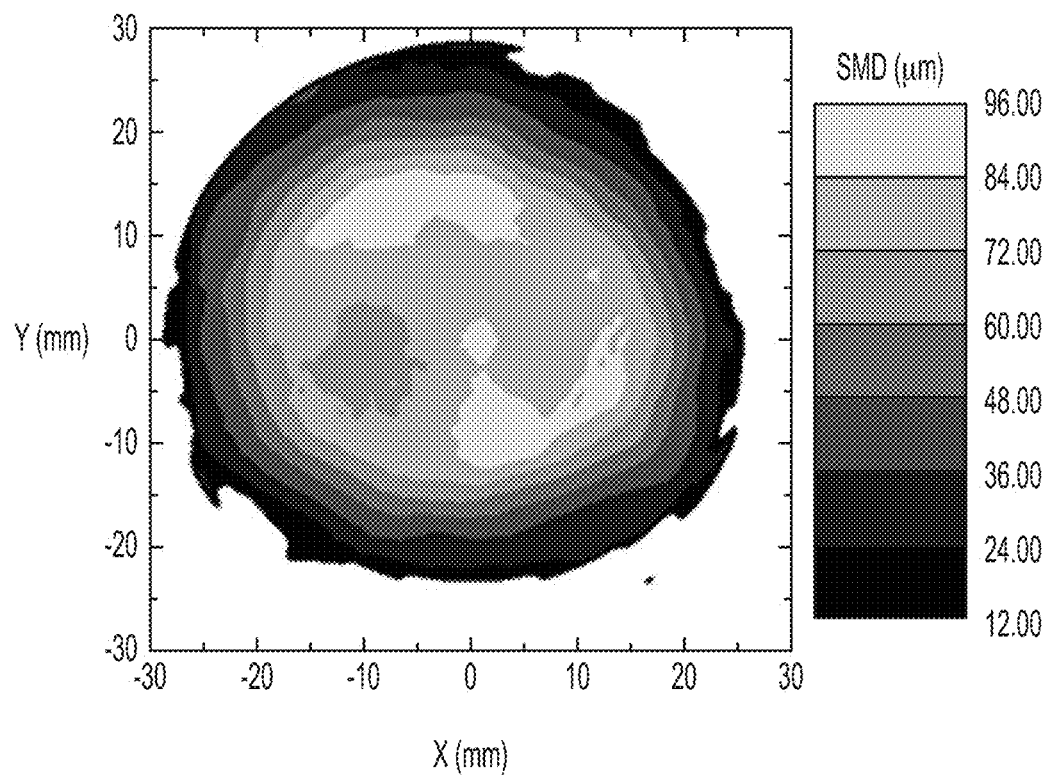
FIG. 7 is a plot showing an experimental evaluation of an SMD distribution over a droplet distribution.

FIG. 7 shows an example of a plot of planar SMD (drop size) distribution obtained from a liquid spray. Sample data obtained from the spray obtained using an oil nozzle is shown in FIG. 7. As shown in FIG. 7, the drop sizes may be obtained over a full plane. Alternatively, or in addition, drop sizes of droplets of a region of the plane may similarly be obtained, as shown in FIG. 7.

Figure 8:
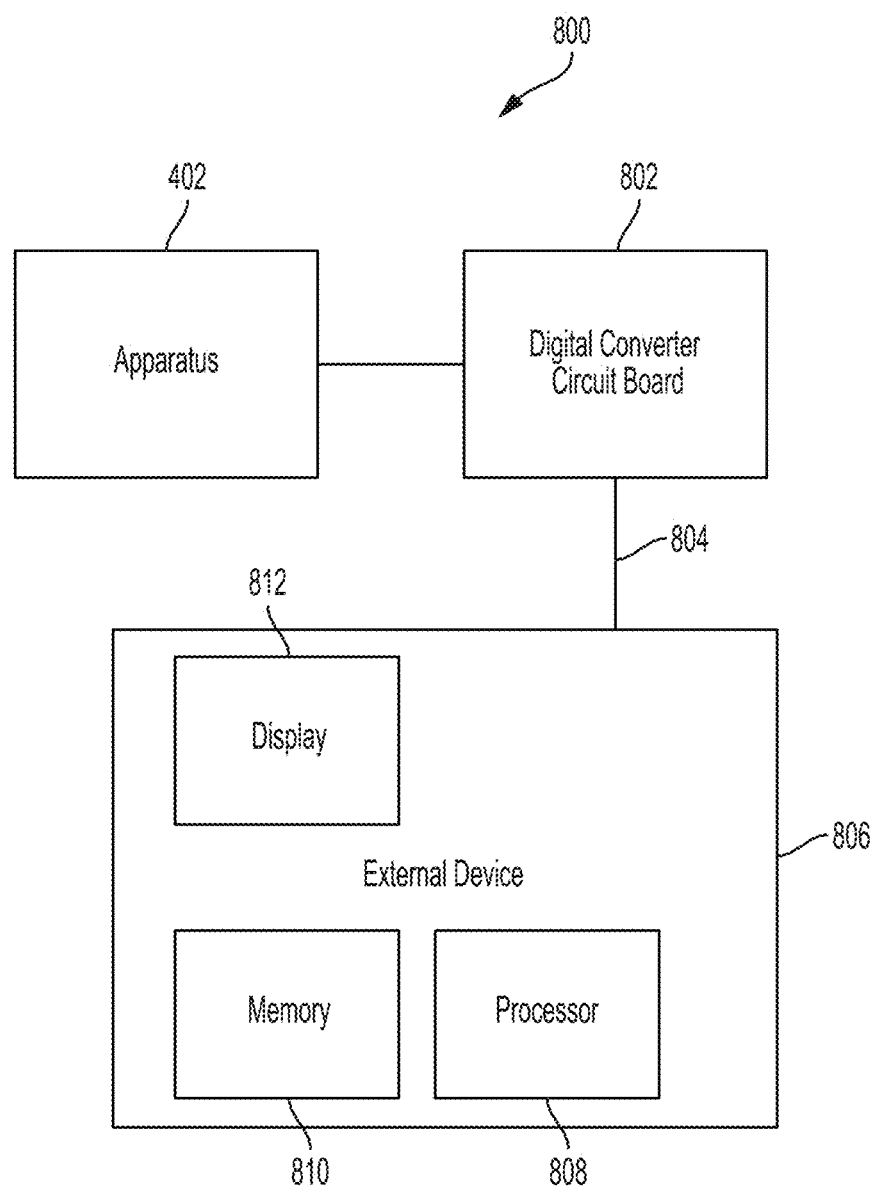
FIG. 8 is a block diagram showing the planar drop sizing apparatus connected to an external device to display the data collected by the planar drop sizing apparatus.

The apparatus shown in FIG. 4 is recreated in a block diagram shown in FIG. 8. FIG. 8 shows an example of a system 800 utilizing the apparatus 402 and additional external components. The apparatus 402 may also include a signal converter, such as an analog to digital converter circuit board 802 capable of converting analog signals from the linear arrays 206 to voltages. In other examples, no signal conversion is necessary and the signal converter may be omitted. A deconvolution algorithm executable by a processor 808 executing instructions stored in memory 810 or other logic/devices may be used to convert the measured scattered intensity and extinction into planar drop sizes. A data transmission mechanism, such as a data cable 804 may be included in the system 800. In other examples, the data cable 804 may be replaced with wireless communication. The data cable 804 may be capable of transmitting data from the analog to digital converter 802 to devices 806 external to the apparatus 402. For example, an external device 806 capable of receiving data from the data cable 804 may include a display 812 to show the data results of the algorithm. The display 812 may be driven by the processor 808 to display the data, generate reports, generate graphic displays, such as graphs or charts regarding the data. The memory 810 may store instructions executed by the processor 808 and data generated by the system. In other examples, the processor, the memory 810, the display 812, or any combination may be included in the apparatus 402.

The processor 808 may select and filter data stored in the memory 810 to perform calculations as well as perform calculations. The processor 808 may direct the storage of calculations to the memory 810. Alternatively or in addition, the processor 808 may control the operation of the lasers 203 and arrays 206 by selectively turning the lasers 203 or the arrays 206 on or off. Alternatively or in addition, the processor 808 may control the spray 207, a velocity of the spray 207, a pressure of the spray 207, and other parameters by which the spray 207 operates. Alternatively or in addition, the processor 808 may direct the chopper 208 to place either the laser light filter 211 or the neutral density filter 213 in the path of the scattered light from the spray 207 to the array 206. The selection of filters 211, 213 may be based on which measurement (extinction or scattered intensity) is desired to be taken. Alternatively or in addition, the processor 808 may drive the communication of data from the apparatus 402 to the external device 806 including the memory 810. The system 800 may be automated by the processor 808 such that the functionality of all of the components of the system 800 may be performed by the processor 808.

The processor 808 may be any device that performs logic operations. The processor 808 may be in communication with the memory 810. The processor 808 may also be in communication with additional components, such as the display 812. The processor 808 may include a general processor, a central processing unit, an application specific integrated circuit (ASIC), a digital signal processor, a field programmable gate array (FPGA), a digital circuit, an analog circuit, a microcontroller, a controller, and/or any other type of processor. In some examples, the processor 808 may include one or more elements operable to execute computer executable instructions or computer code embodied in memory.

The memory 810 may be any device for storing and retrieving data or any combination thereof. The memory 810 may include non-volatile and/or volatile memory, such as a random access memory (RAM), a read-only memory (ROM), an erasable programmable read-only memory (EPROM), and/or flash memory. Alternatively or in addition, the memory may include an optical, magnetic (hard-drive) or any other form of data storage device. The memory 810 may record data received from the apparatus 402 such as measured extinction or scattered intensities. The data stored in the memory 810 may be prompted by the processor 808. The processor 808 may compute a phase function for droplets of the spray 209 utilizing equations (5)-(8) recited above. The processor 808 may use the phase function calculation to obtain the droplet size using the Mie Theory.

The system 800 may be implemented with additional, different, or fewer components. For example, the system 800 may include only the apparatus 402. Similarly, each component may include additional, different, or fewer components. For example, the external device 806 additionally include a monitor, for example.

Some data measured by the arrays 206 may be stored in the memory 810, such as a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 800 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action includes setting a Boolean variable to true and the second action is initiated if the Boolean variable is true.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While the invention has been described in terms of specific embodiments, including particular configurations, measurement techniques and materials, it is apparent that other forms could be adopted by one skilled in the art. Accordingly, it should be understood that the invention is not limited to the specific disclosed embodiments. Therefore, the scope of the invention is to be limited only by the following claims.

The invention claimed is:

1. A method comprising:
   forming a plurality of laser sheets from respective laser light generated by a plurality of laser light sources, each respective laser light directed to a lens;
   supplying the laser sheet to a spray of liquid causing an amount of scattered light to emit from the spray;

sensing the scattered light with a plurality of sensing elements at a plurality of respective view angles;

measuring a scattered intensity of the scattered light sensed from the spray at the plurality of respective view angles; and obtaining drop sizes in the spray from the measured scattered intensity.

2. The method according to claim 1, wherein the respective view angles comprise at least six view angles.

3. The method according to claim 1, wherein the respective view angles are separated by 30 degrees.

4. The method according to claim 1, wherein the sensing elements comprise a linear array of sensing elements.

5. The method according to claim 1, wherein the sensing elements comprise a photo-diode array.

6. The method according to claim 1, further comprising:

passing the scattered light through a neutral density filter of a chopper resulting in a decreased intensity scattered light;

wherein sensing the scattered light comprises sensing the decreased intensity scattered light with the plurality of sensing elements; and wherein measuring a scattered intensity comprises measuring an extinction of the scattered light from the spray at the respective view angles.

7. The method of claim 6, wherein obtaining drop sizes in the spray from the measured scattered intensity further comprises obtaining drop sizes in the spray from the measured scattered intensity and the measured extinction intensity; and obtaining a drop size profile of an entire plane containing the spray.

8. The method of claim 6, further comprising selectively oscillating the chopper to allow the scattered light to pass through the neutral density filter when sensing the decreased intensity scattered light or selectively oscillating the chopper to allow the scattered light to pass through a laser light filter when sensing the scattered intensity of the scattered light.

9. The method of claim 1, wherein the laser sheet comprises a wavelength of 632 nm.

10. The method of claim 1, wherein the laser sheet comprises a wavelength in an x-ray spectrum.

11. A method of measuring drop sizes in a spray comprising the steps of: installing a plurality of laser sources on respective surfaces, the laser sources configured to produce laser light to illuminate a spray of liquid from a plurality of view angles;

producing a laser sheet from the laser light;

illuminating the spray from the view angles using the laser sheet;

measuring a plurality of scattered intensities of the laser sheet at the view angles; and deconvoluting a plurality of drop sizes from the scattered intensities of the laser sheet.

12. The method of claim 11, wherein illuminating the spray from the view angles comprises illuminating the spray from at least 6 view angles using the laser sources to produce laser sheets.

* * * * *